M. H. MANDELBAUM & G. F. MAISCH.
CURRENCY SELECTOR.
APPLICATION FILED DEC. 12, 1913.

1,233,490. Patented July 17, 1917.
9 SHEETS—SHEET 1.

M. H. MANDELBAUM & G. F. MAISCH.
CURRENCY SELECTOR.
APPLICATION FILED DEC. 12, 1913.

1,233,490.

Patented July 17, 1917.
9 SHEETS—SHEET 2.

M. H. MANDELBAUM & G. F. MAISCH.
CURRENCY SELECTOR.
APPLICATION FILED DEC. 12, 1913.

1,233,490.

Patented July 17, 1917.
9 SHEETS—SHEET 3.

M. H. MANDELBAUM & G. F. MAISCH.
CURRENCY SELECTOR.
APPLICATION FILED DEC. 12, 1913.

1,233,490.

Patented July 17, 1917.
9 SHEETS—SHEET 4.

M. H. MANDELBAUM & G. F. MAISCH.
CURRENCY SELECTOR.
APPLICATION FILED DEC. 12, 1913.

1,233,490.

Patented July 17, 1917.
9 SHEETS—SHEET 6.

M. H. MANDELBAUM & G. F. MAISCH.
CURRENCY SELECTOR.
APPLICATION FILED DEC. 12, 1913.

1,233,490.

Patented July 17, 1917.
9 SHEETS—SHEET 7.

UNITED STATES PATENT OFFICE.

MAURICE H. MANDELBAUM AND GUSTAVE F. MAISCH, OF CHICAGO, ILLINOIS; SAID MAISCH ASSIGNOR TO SAID MANDELBAUM.

CURRENCY-SELECTOR.

1,233,490.

Specification of Letters Patent.

Patented July 17, 1917.

Application filed December 12, 1913. Serial No. 806,185.

*To all whom it may concern:*

Be it known that we, MAURICE H. MANDELBAUM and GUSTAVE F. MAISCH, both citizens of the United States, and residents of Chicago, in the county of Cook and State of Illinois, have invented certain new and useful Improvements in a Currency-Selector, of which the following is a specification.

Our invention relates to a machine which is adapted on actuation of the proper keys to designate the smallest number of currency units necessary in order to equal the total of the sum involved and may be termed a currency selector or currency unit designating device.

In the making up of pay-rolls particularly in cases where the actual currency is delivered to the employee, it becomes essential that the varied sums payable to each employee should be separated into the currency units required to make up the total. That is to say, in making up a pay-roll consisting of many unequal sums, it is necessary to know the number of units such a dollars, halves, quarters, etc., which must be procured in order that the sum payable to each individual may be equaled. This is possible by the laborious method of mentally figuring and making a note of these units as applied to each sum, but the purpose of this machine is to obviate such procedure and mechanically separate and designate the required units for each sum.

Mechanism by which the above result as broadly stated may be accomplished may vary widely, but in all such mechanism many of the elements must remain constant. For instance, it will be understood that mechanism must be provided whereby on the actuation of the proper key a plurality of registering or totalizing mechanisms will be affected. This necessarily goes to the principle of the machine. However, to successfully construct a machine of this type, provision must be made whereby mistakes in actuation are impossible and wherein operation may be carried on by unskilled persons. It is to these features in the nature of refinements to which this invention more specifically relates. For instance, means are provided whereby a key once partially actuated, the actuation must be completed before any further actuation of any of the keys is permitted or before the machine can be cleared; that is, the accumulators set back to naught; further, in the present machine, if the canceling or clearing lever is partially actuated, the stroke must be completed before any further actuation of any of the keys may take place; further, no two keys in the same row may be simultaneously actuated; that is to say, no two keys representing the same denomination of currency may be simultaneously actuated. However, keys representing different denominations of currency may be simultaneously actuated, this permitting the setting up simultaneously of the entire sum and allows the operator to use both hands.

Our device acts also as an adding machine, the accumulators which show the total number of units indicating also the total in dollars and cents when the number of units is multiplied by the value of the unit represented thereby. The device might also readily be constructed to indicate the units in terms of dollars and cents if desired.

Other important advantages will appear more specifically hereinafter in connection with the description of the mechanism herein sought to be protected.

The invention will be more readily understood by reference to the accompanying drawings, wherein.

Fig. 9ª is a similar view showing the rocker in partially returned position;

Figures 10, 11:
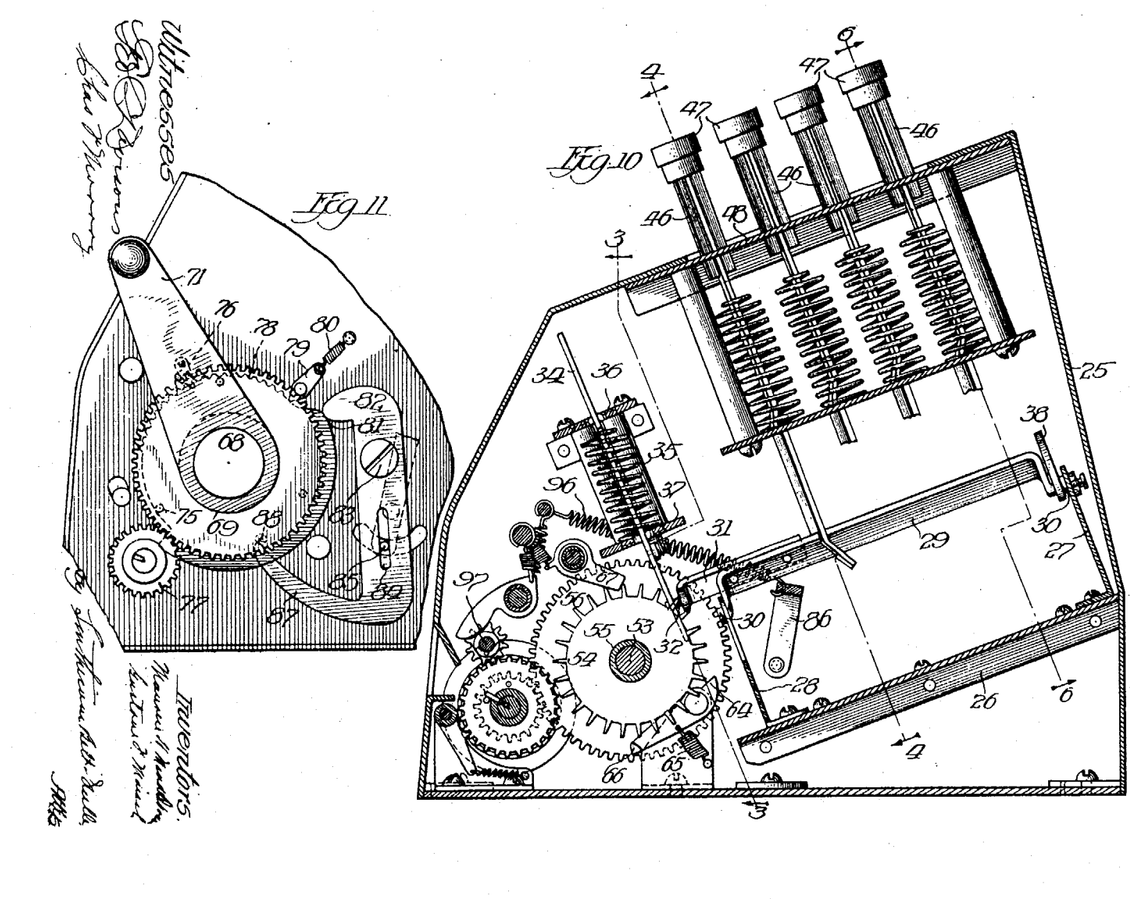
Fig. 10 is an end elevation of the machine with the outer casing removed, the view being taken on the line 10—10 of Fig. 1.
Fig. 11 is an enlarged elevation of the canceling lever and associated mechanism.
Figure 12:
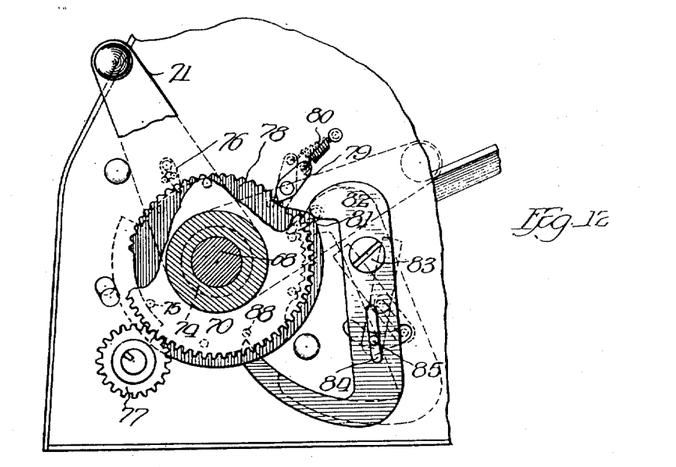
Fig. 12 is a similar view showing in detail some of the parts omitted from Fig. 11.

Referring more particularly to the drawings, it will be seen that we provide a casing 25, within which is mounted the base member 26, of a frame, having perpendicular side walls 27, 28, as best shown in Fig. 10. Within this frame and rotatably mounted in the side members thereof, are the rockers 29, these rockers being in the form of elongated U-bars, each thereof having trunnions 30, at its ends, which trunnions are seated in apertures in the upstanding side plates 27, 28. As shown in Fig. 10, each rocker is provided with an extension 31, which may be riveted or otherwise rigidly secured thereto. A pin 32, in the end of the extension 31, is adapted to register with and operate in a groove 33, formed in a vertical slide bar 34, (see Fig. 3). By means of this slide bar and its associated mechanism, motion is transmitted to the accumulator wheel as will be later described. The slide bars 34 are normally held in raised position by means of an expansion spring 35, seated between horizontal cross bars 36, 37, which bars serve as guides for the slide bars. By reason of the connection between the slide bars and the rocker bars 29, the spring 35, serves to normally maintain the rockers in elevated position. that is, the position as shown in Figs. 4, 5 and 6.

Figure 6:
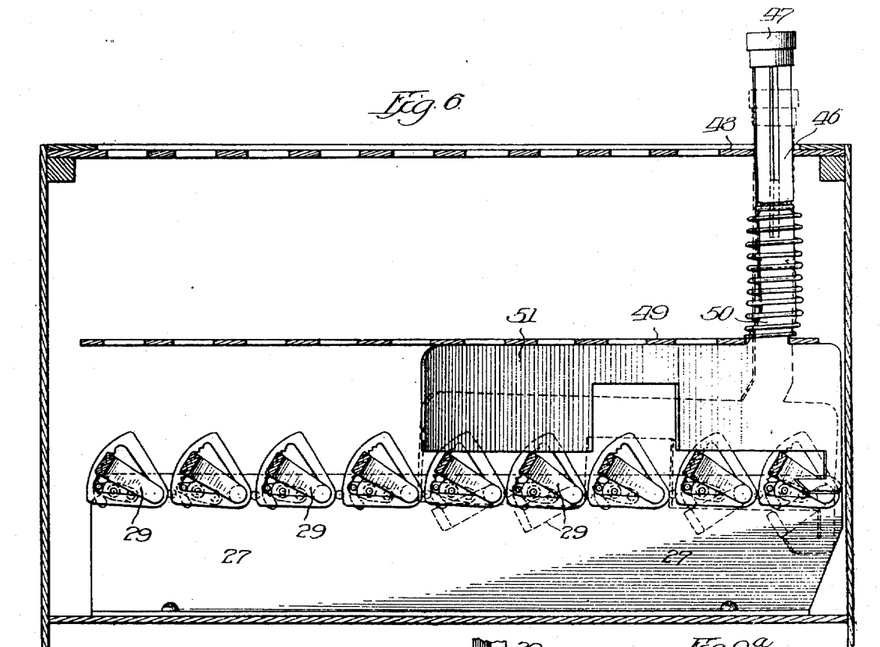
Fig. 6 is a sectional elevation taken on the line 6—6 of Fig. 10, as viewed in the direction of the arrows.
Figures 7, 8, 9, 9A:
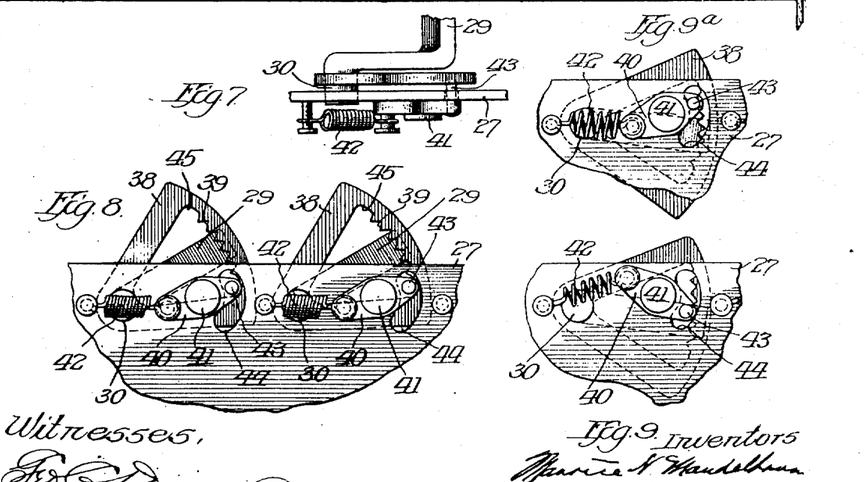
Fig. 7 is a fragmentary detail showing in plan the form of connection of the rocker bars as relates to the full stroke mechanism.
Fig. 8 is a fragmentary elevation of two of the rockers and segments, as illustrated in Fig. 7, the rockers being in normal position.
Fig. 9 is a similar view showing the parts in partially actuated position.

The full stroke mechanism for insuring that a key once partially actuated must be given its full stroke before being allowed to return is best shown in Figs. 6 to 9 inclusive. From such figures it will be noted that each rocker 29, is provided near the outer end thereof with a segment 38, the inner portion of which is cut out and an arcuate rack with inwardly facing teeth located on the outer edge of the cut-out portion. Coöperating with the rack 39, is a dog 40, pivoted at 41, to the side member 27, and normally held in substantial alinement with the radial axis of the segment by means of a coiled spring 42. The dog 40 is preferably located exteriorly of the frame member 27, the frame member projecting between the dog and the segment. The dog is provided at its free end with a pin or pawl 43, projecting through an arcuate groove 44, in the frame member 27, and coöperating with the teeth of the rack 39. It will be seen that on the first downward movement of the segment 38, with the rocker 29, the first of the teeth with the rack 39 will cause the dog to rotate against the tension of the spring 42, to a point past its center, as best shown in Fig. 9, and any return movement of the segment is not permitted. However, as the downward movement of the segment continues, the pin or pawl 43, will finally come into register with the cut-out 45, at the end of the rack teeth and be permitted to return to its normal position, which permits the segment and rocker to return to normal position, the dog riding idly over the rack teeth on the upward movement. However, it will be noted on reference to Fig. 9ª, that the complete upward stroke of the segment and rocker must be completed before the segment can again be moved downward. This is one of the most important advantages as it will be seen that an operator might desire to repeat several times the actuation of a certain key and between operations might not allow the key to return to its fully raised position before beginning the next actuation. Such action would result in an incomplete rotation of the number wheel gear. In the present construction and by the simple means thus described the actuation must be complete both in regard to its downward and upward limit before another actuation can take place.

It will be understood that the number and location of the keys will depend largely upon the degree of elaborateness to which the manufacturer desires to go. If, for instance, he wishes to produce a machine in which by the actuation of a single key a complete number may be set up, the number of keys will be large. If, however, a less elaborate machine is to be produced it may be arranged as herein shown and will require the actuation of two or more keys for the setting up of a complete sum. In any case one key will be adapted to actuate several rockers. If, for instance, the sum of forty-five cents is to be set up, a single key will be actuated and this key will in turn actuate the rocker controlling the twenty-five cent unit and the rocker controlling the twenty cent unit, or, for example, if a ninety cent sum is to be set up, a single key will be actuated, which key will in turn act upon four rockers, the one controlling the fifty cent unit, the twenty-five cent unit, the ten cent unit and the five cent unit. Such a key is shown in Fig. 6.

Figure 4:
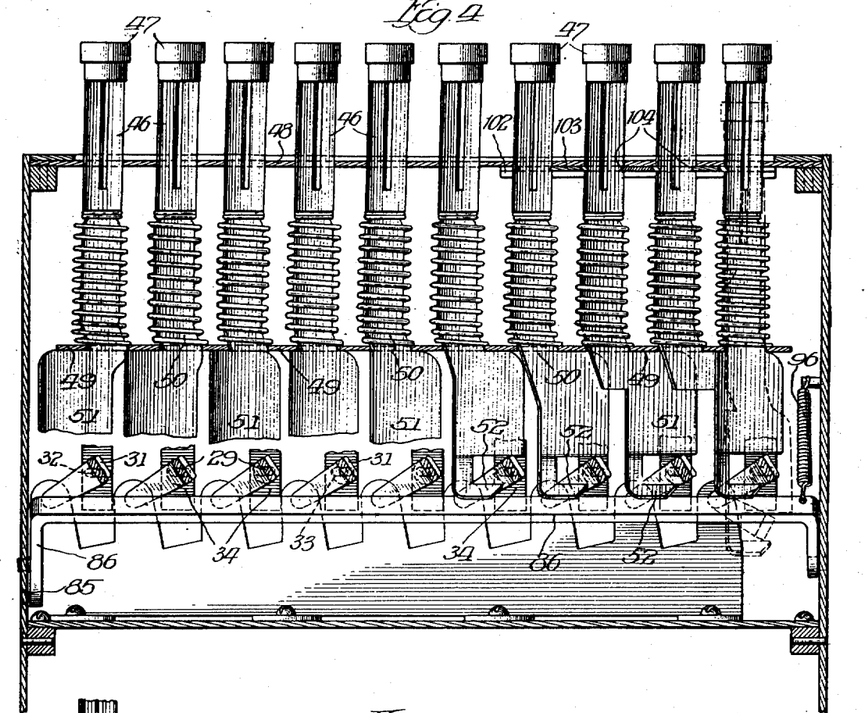
Fig. 4 is a section on line 4—4 of Fig. 10.
Figure 5:
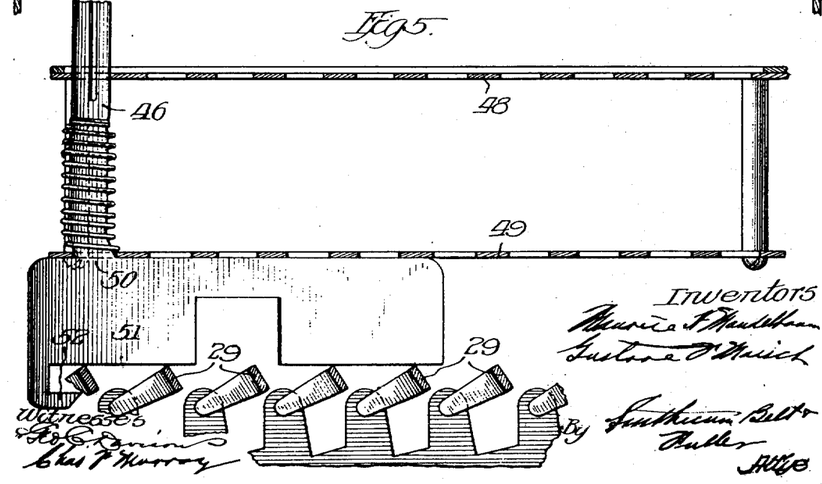
Fig. 5 is a fragmentary detail similar to that of Fig. 4.

The key construction, as best shown in Figs. 4, 5 and 6, preferably includes a slide bar 46, surmounted by a cap 47 and extending through a slot in the top cover plate 48, and through a slot in an intermediate plate 49. The slots in the plates 48, 49, are off-set with relation to each other, the lower portion of the slide bar 46, having also an off-set portion 50, in the nature of a cam at the point where it passes through the slot in the plate 49. This construction provides for a limited sidewise or horizontal movement of the base 51, of the key. In order to lock the key to a rocker and thereby prevent the return of the key itself until the rocker is permitted to return by the full stroke mechanism heretofore described, we provide in the lower portion 51, a hook 52, as best shown in Figs. 4 and 5. This hook is, when the key is in raised position, out of the plane of rotation of its cooperating rocker. However, as the key is depressed, the cam portion 50, thereof moves the hook 52 beneath its cooperating rocker and locks the key to the rocker until the key is returned to its upper position. It is essential that after a key has performed its function in actuating one or more rockers, it should be completely disengaged from said rocker to permit actuation of such rockers by other keys. Furthermore, the hook 52 has an added function as a lock for the reason that if any key be partially depressed and thereby acting on one or more rockers, the hook 52 on another key cannot be engaged with the rocker being acted upon by the incompletely actuated key for the reason that the foot will contact such rocker and prevent actuation thereof.

Figure 1:
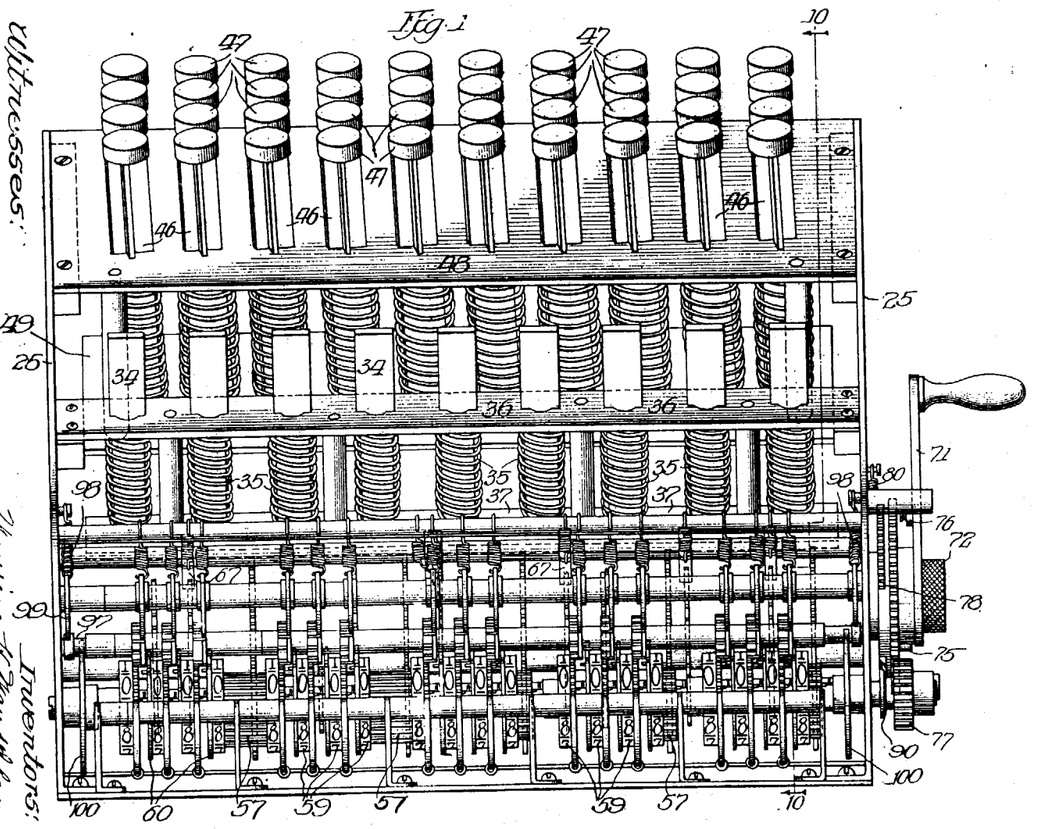
Figure 1 is a front elevation of our novel machine with the front cover plate removed.
Figure 2:
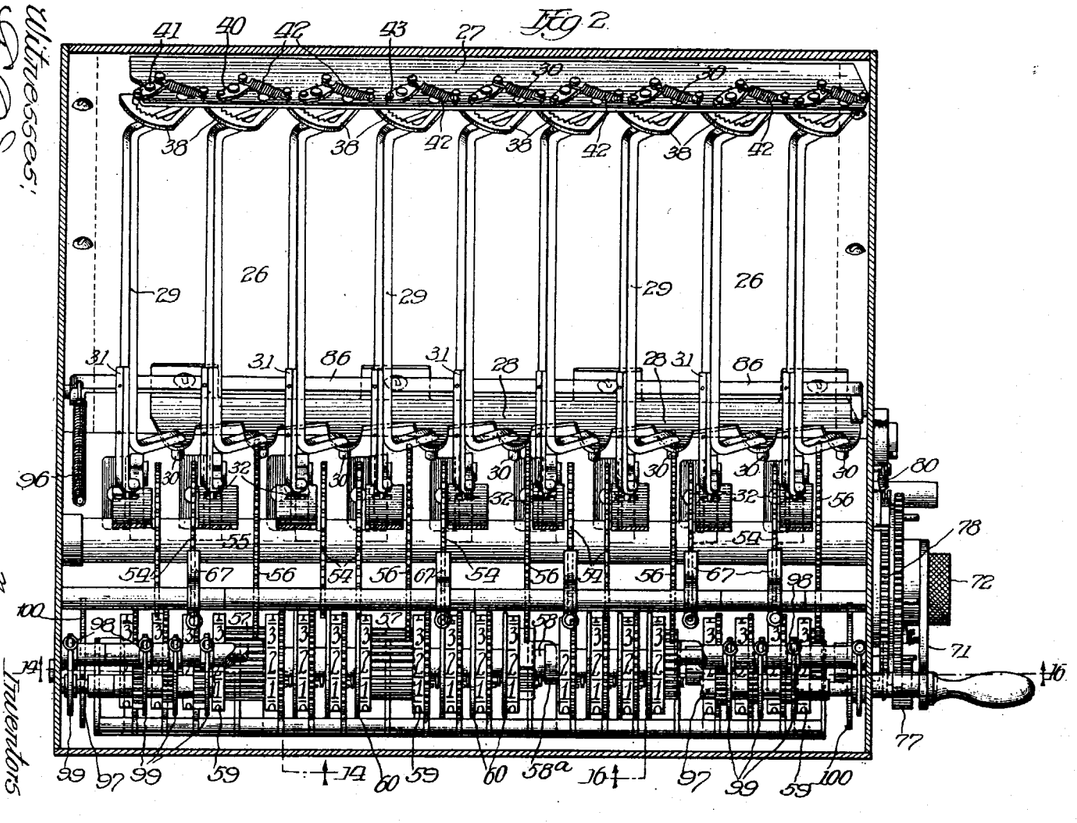
Fig. 2 is a plan view with the actuating keys removed.
Figure 3:
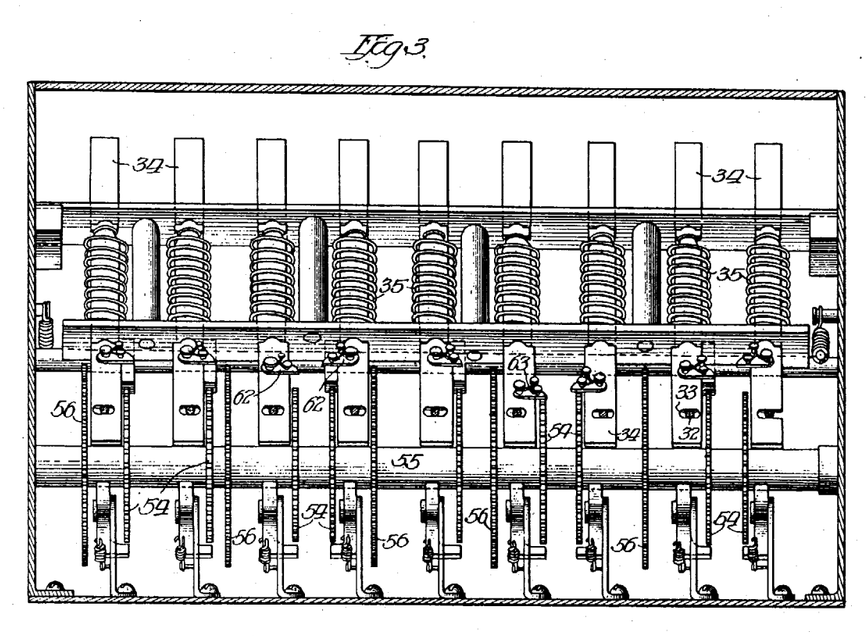
Fig. 3 is a sectional elevation on line 3—3 of Fig. 10.
Figure 19:
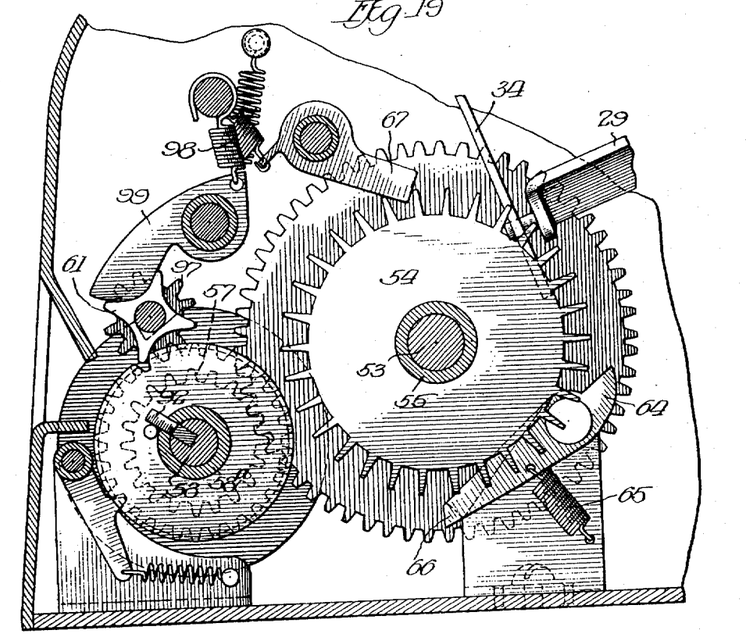
Fig. 19 is an enlarged detailed elevation of the same taken from the opposite side.
Figure 20:
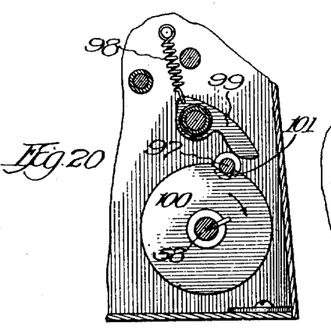
Fig. 20 is a detail elevation showing the lifting cam for disconnecting the number wheels on cancellation.

The accumulating or recording mechanism acted upon by the keys and rockers through the push rod 34 will now be described. On a transverse shaft 53 is mounted a plurality of ratchet or star wheels 54, these wheels being preferably secured on a bushing 55, which bushing likewise carries gear 56, the bushing being freely rotatable on the shaft 53. Thus the star wheel 54 and gear 56 rotate in unison, the gear being in mesh with a pinion 57 rotatably mounted on a transverse shaft 58. The pinion 57 is provided with an annular concentric reduced portion 58$^a$, acting as a bushing on which is rigidly mounted a number wheel 59 and a cam wheel 60, the cam wheel actuating the Geneva movement 61, for carrying forward from units to tens. Inasmuch as such mechanism is well understood in the art, we will not enter into a specific description thereof. Motion is imparted to the star wheel 54 by the pusher 34, which is engaged by the rocker 29 in a manner as best shown in Fig. 3. In that view it will be seen that a pawl or dog 62 is pivoted on the slide bar 34 and overhangs the edge thereof. A spring 63, holds the dog in operative position and permits the return of the slide bar to its original position, the dog riding over the teeth of the star wheel in such return movement. Although the slide bars 34 have a fixed travel, the extent of actuation of the star wheel is controlled by the location of the dog in the height of the bar. Thus the movement of the star wheel may be made great or small according to the location of the dog 62. As a means for preventing overthrow of the star wheel and also to act as a stop for the downward movement of the slide bar 34, we provide beneath each slide bar, as best shown in Figs. 3 and 19, a pivoted dog 64, normally held in inoperative position by means of a coiled spring 65. As the bar 34 moves downward its lower end contacts the short arm of the dog 64, and raises the opposite end 66, into engagement with the star wheel, thus preventing any overthrow or further movement thereof in either direction until the bar 34 is returned. As stated, the dog 64 also acts as a stop to limit the downward movement of the bar 34. Backward movement of the star wheel is prevented by the dog 67.

The mechanism thus far described has related to the feature of selecting the units of a sum and registering the total of such units by means of suitable accumulator wheels and no description has been made of the mechanism by which the total set up may be canceled and the machine cleared. In our novel construction the arrangement is such that during the actuation of any key and prior to the completion thereof, the cancellation lever may not be moved; and, reversely, during the stroke of the cancellation lever and prior to the complete cycle thereof, none of the keys may be actuated.

Figure 13:
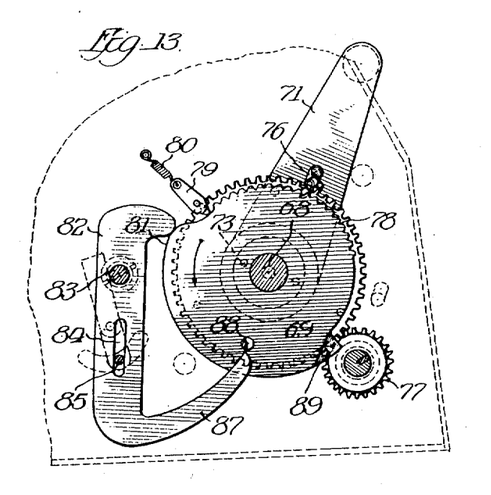
Fig. 13 is a similar view of the same mechanism taken from the opposite side thereof.
Figure 14:
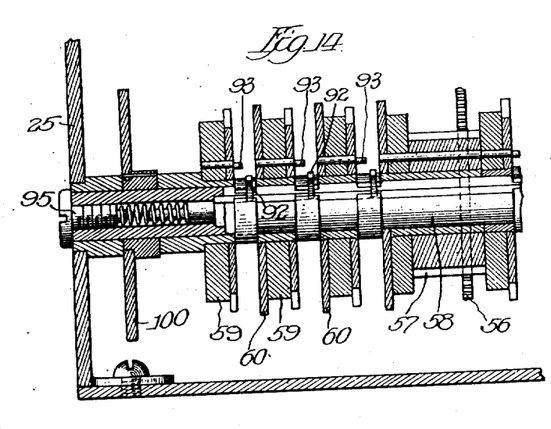
Fig. 14 is an enlarged sectional detail taken on the line 14—14 of Fig. 2.
Figure 15:
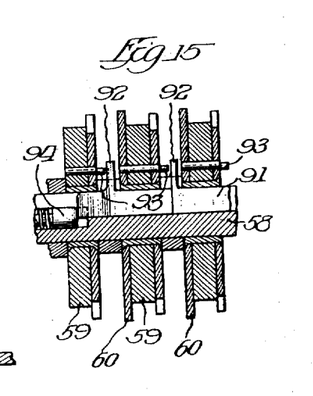
Fig. 15 is a similar view of the same mechanism showing in detail the mechanism for effecting cancellation of clearing.
Figures 16, 17:
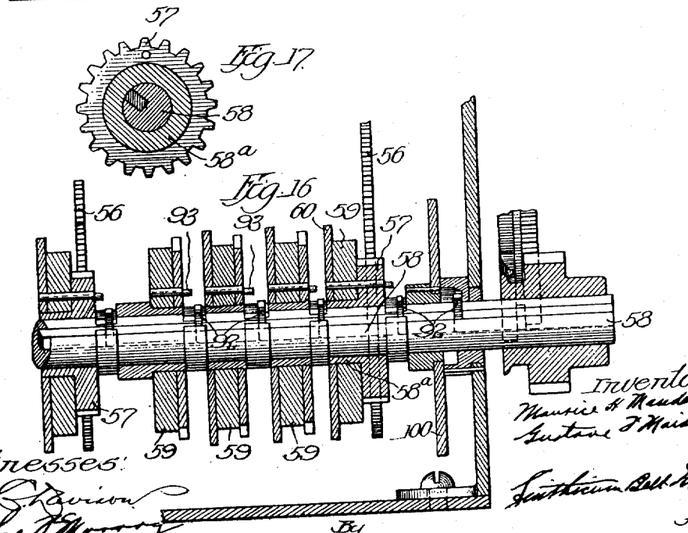
Fig. 16 is a similar view on the line 16—16 of Fig. 2, showing in detail the construction of the parts on the opposite end of the accumulator wheel shaft.
Fig. 17 is an enlarged cross sectional view of the pinion acted upon by the cancellation mechanism to effect the rotation of the number wheel shaft.
Figure 18:
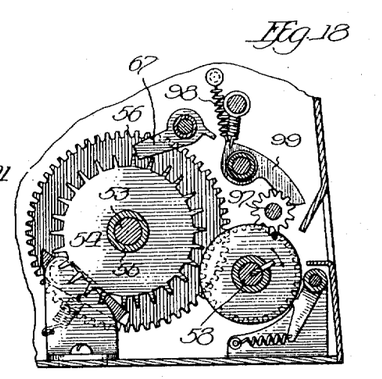
Fig. 18 is a fragmentary detail showing the accumulator wheel construction.

The clearing or cancellation mechanism comprises a stub shaft 68, rigidly mounted in the casing 25, on which shaft is rotatably mounted a combined mutilated gear and cam 69, and a gear 70. An operating handle 71, is also mounted on the stub shaft and serves to retain the gear and cam in position through the assistance of a locking nut 72. The lever and cam are locked together for movement in unison by means of a pair of oppositely disposed pins 73. The gear 70, is mounted directly on a bushing or sidewise extension 74, of the cam member 69, and is not rigidly connected to either the handle or the cam member except at certain points in the stroke of the handle. This connection between the handle and the gear 70, is accomplished by means of three pins 75, equally spaced and projected from the outer face of the gear. A pawl 76, pivoted to the handle 71, coöperates with the pin, making a positive connection on the forward stroke of the lever but freely passing the pins in the reverse movement of the handle. By this means the gear is always rotated in a forward direction. This gear coöperates with a pinion 77, feathered on shaft 58. The cam member 69, and its mutilated gear have a number of functions. The gear teeth 78 thereof coöperate with a dog 79, pivoted to the casing and held in the position of Fig. 13, by means of the coiled spring 80. This construction provides for a full stroke movement of the handle in either direction in a manner similar to that described in connection with the full stroke movement for the rockers 29. The cam portion 81, is adapted to act upon a bell crank 82, pivoted at 83 to the casing and having a slot 84 therein, within which is accommodated a pin 85, formed on a rocker 86, pivoted at each end in the casing, this rocker underlying all of the rockers 29, out of contact therewith normally but adapted to be contacted and moved downward at the beginning of the actuation of any of the rockers 29. This causes a rotation of the rocker 86, and a movement of the bell crank 82, to an extent sufficient to project the hooked end or extension 87 thereof into the path of a pin 88, on the cam 69, and thus prevent any actuation of the handle or cam during the actuation of any key. The bell crank 82, has an additional function in that as the cam 69 is rotated, the cam portion 81 causes a rotation of the bell crank 82, the rotation of the bell crank causing a movement of the rocker 86, into a substantially vertical position directly underlying all the rockers 29, thereby preventing any movement of the rockers 29 during the movement of the cancellation lever. The other cam portion of the part 69, is in the form of a wedge 89, and acts upon an annular shoulder 90, integral with the pinion 77, heretofore referred to. The first turning movement of the cam member 69, therefore, causes an inward movement of the pinion 77, this movement causing in turn a movement inwardly of a plurality of slide catches 91, each of which catches has a right-angled arm or projection 92, adapted to coöperate with pins 93, extending between adjacent number wheels and gears, as best shown in Figs. 14 to 16 inclusive. This inward movement of the slide catches is opposed by a spring-actuated plunger 94, seated within the end of the shaft 58, and held in place by a screw 95. The inward movement of the slide catches brings the right angled extensions thereof into the plane of the pins 93, and thereby rigidly connects the number wheels with the shaft 58 and permits the rotation of the wheels under the action of the pinion 77, and gear 70, as required. This clearing movement is effected during the forward stroke of the cancellation lever 71, due to the engagement of the dog 76, with one of the pins 75, on the gear 70. On the return stroke the gear 70 remains idle, the dog 76 riding over the next following pin 75. At the completion of the return stroke, the bell crank 82, rides down the cam 81, and the rocker 86 is returned to its normal position, as best shown in Fig. 10, against the tension of a spring 96.

It will be understood that prior to any turning or clearing movement of the number wheels, the number wheel pinions and Geneva movement must be lifted out of mesh with the number wheel gears. These number wheel pinions are mounted on a single shaft 97, adapted for a limited arcuate movement against the force exerted by springs 98, through a lever 99. Provided at each end of the machine and rigidly secured to number wheel shaft 58, is a disk 100, having a notch 101, therein, within which the shaft 97 normally rests. However, on the first rotation of the shaft 58 and prior to the time that the slide catches 91 coöperate with the pins 93, to cause rotation of the number wheels, the disk 100 is rotated causing the shaft 97 to ride out of the notch in the disk 100 and be lifted, thus disengaging the number wheel pinions from the number wheels.

In certain instances different keys and rockers act upon the same accumulator. In such instances it is desirable to provide efficient locking means and preferably a locking means additional to the means heretofore described such as the hooks 52 on the lower portions of the keys. Such an additional means is shown in Fig. 4, as applied to the four keys on the right hand side of the drawing. These keys are intended to register respectively one, two, three and four cents and act upon the same accumulator mechanism. We have therefore provided at a point beneath the top cover plate a pair of guides 102, between which are slidably carried separate locking members 103. The edges of these members are inclined and coöperate with notches 104, in the sides of the keys. It will be seen that on depressing any one of the four keys the sliding member 103, coöperating therewith is forced horizontally into engagement with the next adjacent key. The ends of adjacent sliding members being in contact the next adjacent sliding member is also moved thus locking all the keys except the one actually depressed. This locking remains efficient until the key is returned to its normal position, when any of the other keys may then be depressed.

The operation of the machine need not be specifically described in detail in view of the fact that the various steps have been described in connection with a description of the mechanism. A specific instance will, however, be set out. Assuming that the sum of ninety cents is to be set up and referring particularly to Fig. 5, it will be seen that on depressing the key 46, the base portion 51 thereof will be moved downward and sidewise until one edge thereof contacts the tops of the rockers 29, and the hook 52 thereof underlies one of said rockers. It will be noted that on further downward movement four rockers will be actuated, namely, the rocker representing a fifty cent unit, a twenty-five cent unit, a ten cent unit and a five cent unit. Each of these rockers, as shown in Figs. 10 and 19, coöperates with its associated slide bar 34, and causes downward movement thereof, this slide bar acting upon its star wheel 54 and through the associated gearing setting up on a number wheel the figure one. Thus on four accumulator wheels the figure one will be set up by the actuation of one key. To clear the number wheels, the handle 71 is pushed forward with the resulting steps as heretofore described and, when returned to normal position the machine will be again ready for further actuation.

Many of the elements of the present machine are adapted for use in other relations and in other types of machines. Many of the parts may be advantageously used in other forms of adding machines, cash registers, etc. Furthermore, the present machine may be with slight modifications adapted for many other uses. It will be understood that although we have shown no modifications, we do not wish to be limited other than by the scope of our claims to the exact construction herein shown and described.

We claim:

1. In a device of the class described, the combination of a plurality of independent accumulator mechanisms, a rocker for actuating each accumulator mechanism, and a key, said key being provided with an extension whereby the key is adapted to act upon a plurality of said rockers, said key being also provided with a portion underlying one of said rockers when an actuation is taking place, substantially as described.

2. In a device of the class described, the combination of an accumulator mechanism, a rocker for actuating said mechanism, a key acting upon said rocker, and means associated with said key and normally located out of the plane of said rocker, said means underlying said rocker during the actuation of said key, substantially as described.

3. In a device of the class described, the combination of an accumulator mechanism, a rocker for actuating said mechanism, a key acting upon said rocker, said key being provided with a portion normally lying above and in the plane of the rocker, and a portion normally lying beneath and out of the plane of said rocker, and means operable during the actuation of said key and adapted to swing the lower portion of said key to an extent whereby said underlying portion is brought into the plane of said rocker, substantially as described.

4. In a device of the class described, the combination of accumulator mechanism, rockers actuating said mechanism, keys for actuating said rockers, and means locking a rocker during actuation thereof preventing actuation of said rocker by any other key, said means including a portion carried by the key and movable therewith to a point beneath said rocker during the stroke of said key, substantially as described.

5. In a device of the class described, the combination of a plurality of independent accumulator mechanisms, a plurality of rockers for actuating one of said mechanisms, keys for actuating said rockers, and a plurality of locking means whereby but one of said keys may be actuated at one time, substantially as described.

6. In a device of the class described, the combination of accumulator mechanism, actuating rockers therefor, keys for actuating said rockers, said keys having a portion adapted to underlie a rocker on sidewise movement of said portion, and means for moving the lower portion of said key in a sidewise direction in order to bring said portion beneath a rocker, said means including a cam acting on said key at the beginning of the stroke of the key, substantially as described.

7. In an adding machine having keys, accumulator mechanism and cancellation mechanism, the combination of a grooved shaft on which accumulator number wheels are mounted, independent catches for each number wheel, said catches being longitudinally slidable in the groove in said shaft, and a cam operable by the cancellation mechanism for sliding said catches.

8. In an adding machine, the combination of a plurality of accumulator mechanisms, a grooved shaft on which said mechanisms are mounted, cancellation mechanism, catches longitudinally slidable in the groove in said shaft, and a cam carried by the cancellation mechanism and adapted to move said catches prior to cancellation.

9. In a machine of the class described, the combination of number wheels, a star wheel for actuating the same, a plunger movable tangentially of the wheel, a spring pawl on said plunger, adapted to engage said star wheel, a rocker engaging at its end with said plunger, a key for actuating said rocker, and a lever mounted in such position that one arm thereof is adapted to be contacted by said plunger at the end of its stroke and the other arm is brought into engagement with said star wheel, substantially as described.

Signed at Chicago, county of Cook, State of Illinois, this 10th day of December, 1913

MAURICE H. MANDELBAUM.
GUSTAVE F. MAISCH.

Witnesses:
CHAS. F. MURRAY,
T. D. BUTLER.